(12) United States Patent
Rung et al.

(10) Patent No.: US 8,390,792 B2
(45) Date of Patent: Mar. 5, 2013

(54) DISTANCE MEASURING DEVICE

(75) Inventors: Bi-Jung Rung, Jung-He (TW); Yi-Chih Yeh, Jung-He (TW); Li-Lu Chen, Jung-He (TW); Yung-Shen Lee, Jung-He (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 590 days.

(21) Appl. No.: 12/649,539

(22) Filed: Dec. 30, 2009

(65) Prior Publication Data
US 2011/0085153 A1 Apr. 14, 2011

(30) Foreign Application Priority Data
Oct. 9, 2009 (TW) .............................. 98134280 A

(51) Int. Cl.
*G01C 3/08* (2006.01)

(52) U.S. Cl. ..................................... 356/4.01; 356/5.02
(58) Field of Classification Search ................. 356/4.01, 356/5.01, 5.02
See application file for complete search history.

(56) References Cited

U.S. PATENT DOCUMENTS

| 7,030,968 B2 * | 4/2006 | D'Aligny et al. ............ 356/5.01 |
| 2009/0168045 A1 * | 7/2009 | Lin et al. ....................... 356/4.01 |

* cited by examiner

*Primary Examiner* — Mark Hellner
(74) *Attorney, Agent, or Firm* — Rabin & Berdo, P.C.

(57) ABSTRACT

A distance measuring device is provided. The distance measuring device includes: a distance sensing unit, for sensing a distance value of a target object; a drive unit, for driving the distance sensing unit to rotate according to a rotation angle; and a compensation unit, for providing a compensation value according to the rotation angle and obtaining an actual distance according to the compensation value and the distance value.

11 Claims, 5 Drawing Sheets

DISTANCE MEASURING DEVICE

CROSS-REFERENCES TO RELATED APPLICATIONS

This non-provisional application claims priority under 35 U.S.C.§119(a) on Patent Application No. 98134280 filed in Taiwan, R.O.C. on 2009/10/9, the entire contents of which are hereby incorporated by reference.

BACKGROUND

1. Technical Field

The present invention relates to a measuring device, and more particularly to a distance measuring device.

2. Related Art

With the development of electronic technology, the laser ranging method has been widely applied in distance measurement. For example, a laser rangefinder is applied in construction, traffic management, topographical reconnaissance, indoor decoration, and other areas. The laser rangefinder is equipped with a laser beam emitter for emitting a laser beam to a target object, and a laser light receiver for receiving a signal reflected from the target object, such that the distance is measured according to the time taken for the light wave to be emitted from the laser beam emitter and received by the laser light receiver.

FIG. 1 shows a conventional two-dimensional laser rangefinder A1, which is mainly formed by a laser beam emitter A11 and a revolving mechanism A12. The laser rangefinder A1 adds a back and forth scanning angle in a horizontal direction to a laser beam emitted by the laser beam emitter A11 through the revolving mechanism A12, such that the laser rangefinder A1 can be used in a robot to achieve functions such as obstacle sensing and environment recognition. Furthermore, if a back and forth scanning angle in a vertical direction in addition to that in the horizontal direction is added, the laser rangefinder becomes a three-dimensional laser rangefinder, and the sensing range thereof becomes three-dimensional, too. As compared with the two-dimensional laser which only scans a planar range, the three-dimensional laser can scan a three-dimensional space. For example, objects such as chairs and tables having different heights and depths can be detected.

The price of three-dimensional rangefinders available in the market is very high, typically ten times higher than that of two-dimensional laser rangefinders for scanning a plane, such that three-dimensional rangefinders cannot be applied widely to various fields. Therefore, simplifying the structure of the three-dimensional rangefinder so as to overcome the problem of the excessively high cost of the conventional three-dimensional laser rangefinder such that it can be widely applied in fields such as environment recognition, environment construction, obstacle detection, and positioning of a robot, is a problem urgently requiring a solution.

SUMMARY

Accordingly, the present invention is directed to a distance measuring device, which includes: a distance sensing unit, for sensing a distance value of a target object; a drive unit, for driving the distance sensing unit to rotate according to a rotation angle; and a compensation unit, for providing a compensation value according to the rotation angle and obtaining an actual distance according to the compensation value and the distance value.

Based on the above, the present invention further includes a revolving unit for driving the distance sensing unit to revolve. A rotation direction of the drive unit may be substantially perpendicular to a revolving direction of the revolving unit.

In addition, the drive unit of the present invention may preferably include: a seat, for disposing the distance sensing unit; a gear, located on a side edge of the seat; a rack, engaged with the gear; and a cam, revolving to drive the rack to displace reciprocally and driving the gear to rotate by the rack, so as to drive the seat to rotate.

The present invention has the effect of using a reciprocating mechanism having a low cost to drive a distance sensing unit to move, so as to add another dimension thereto. For example, an original one-dimensional distance sensing unit achieves the measuring effect of a two-dimensional distance sensing unit by means of the reciprocating mechanism, or an original two-dimensional distance sensing unit achieves the measuring effect of a three-dimensional distance sensing unit by means of the reciprocating mechanism. Since the present invention can solve the problem of an excessively high cost of a conventional three-dimensional laser rangefinder, it can be widely applied in fields such as environment recognition, environment construction, obstacle detection, and the positioning of a robot.

The detailed features and advantages of the present invention are described in detail through the embodiments below, and the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description, which is provided below only for the purpose of illustration, and thus not limitative of the present invention, wherein.

DETAILED DESCRIPTION

Figure 1:
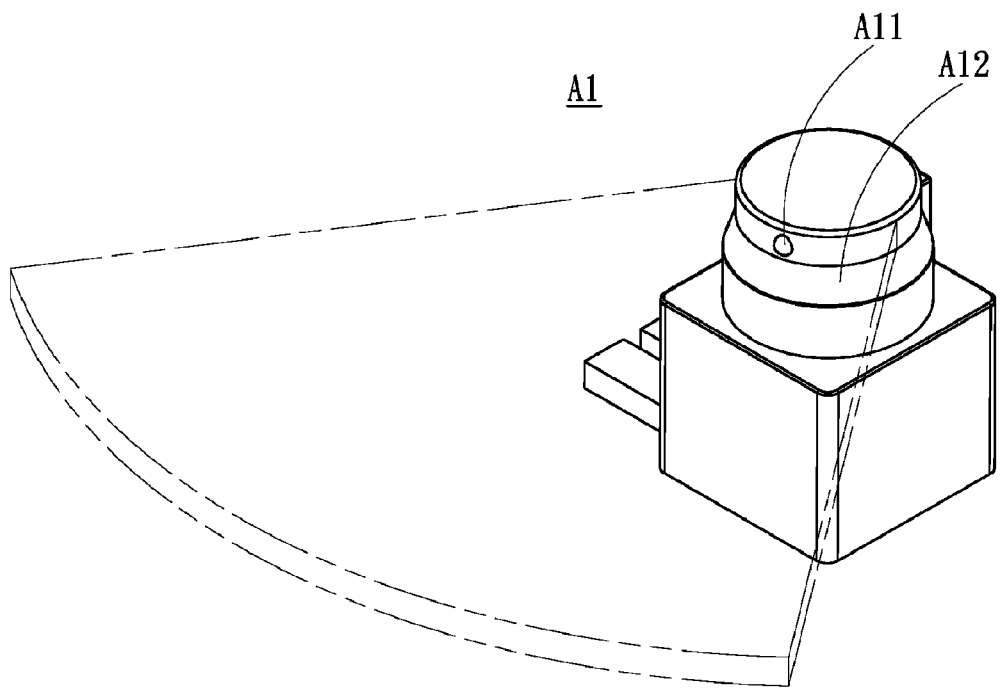
FIG. 1 is a schematic outside view of a conventional two-dimensional laser rangefinder.
Figure 2:
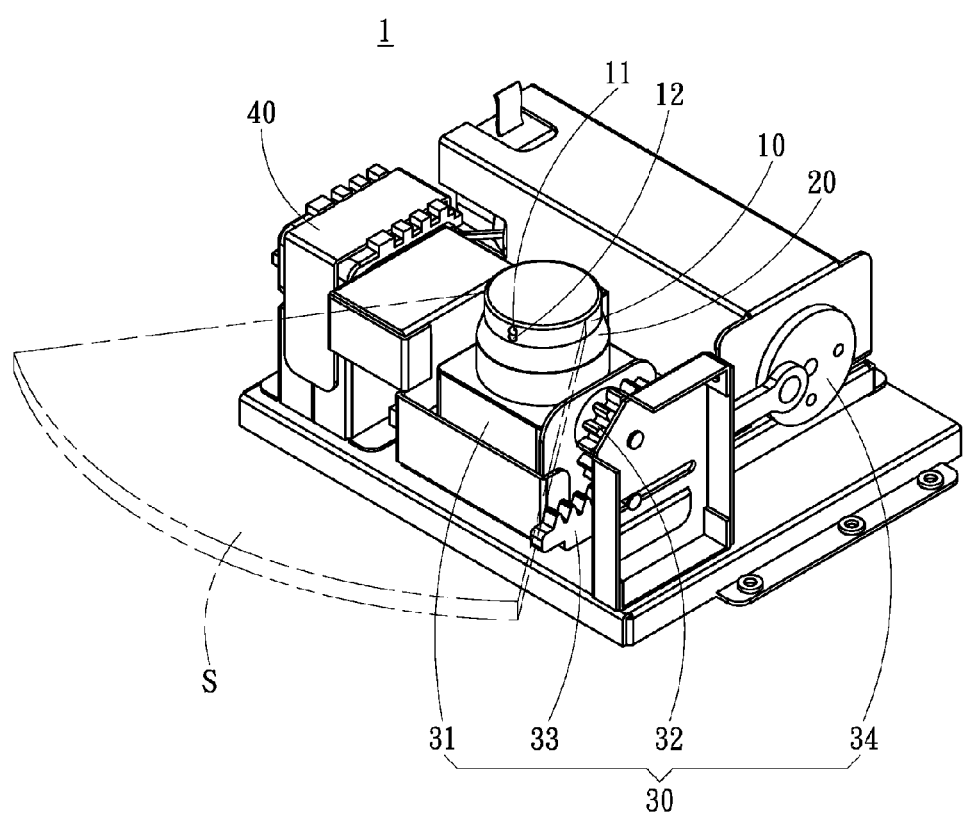
FIG. 2 is a schematic outside view of the present invention.

FIG. 2 shows a distance measuring device in the present invention.

The distance measuring device 1 in the present invention includes a distance sensing unit 10, a drive unit 20, and a compensation unit 40.

The distance sensing unit 10 is used for sensing a distance value of a target object (not shown). The distance sensing unit 10 mainly includes an emitter 11 and a receiver 12. The emitter 11 is used for emitting a distance measuring signal, and the receiver 12 is used for receiving the distance measuring signal reflected by the target object. A distance value between the distance sensing unit 10 and the target object is obtained by the time taken for the distance measuring signal emitted from the emitter 11 and received by the receiver 12. In this embodiment the emitter 11 may preferably be a laser emitter having a laser diode for emitting laser light as the distance measuring signal, but the present invention is not limited thereto. The emitter 11 may also be an infrared emitter for emitting infrared rays as the distance measuring signal or an ultrasonic emitter for emitting an ultrasonic wave as the distance measuring signal. Alternatively, the distance measurement is performed using other light waves or sound waves.

The drive unit 30 is used for driving the distance sensing unit 10 to rotate according to a rotation angle. Herein, the drive unit 30 may be a reciprocating mechanism including a seat 31, a gear 32, a rack 33, and a cam 34. The seat 31 is used for disposing the distance sensing unit 10. The gear 32 is disposed at the seat 31 so that the seat 31 can be rotated along with the gear 32. The gear 32 is engaged with the rack 33. One end of the rack 33 is connected to the cam 34. In this way, the cam 34 may drive the rack 33 to displace reciprocally during rotation, and the rack 33 drives the gear 32 to rotate, so as to drive the seat 31 to rotate. However, the aforementioned structure regarding the drive unit 30 is merely an example, and the present invention is not limited thereto. The drive unit 30 may also be a motor, a multi-link reciprocating mechanism, or other reciprocating mechanisms for driving the distance sensing unit 10 to rotate repeatedly within the rotation angle.

The compensation unit 40 acquires a rotation angle at the time when the drive unit 30 drives the distance sensing unit 10 to rotate, so as to provide a compensation value according to the rotation angle, and obtains an actual distance according to the compensation value and the distance value sensed by the distance sensing unit 10. Herein, the compensation unit 40 may preferably be an encoder, but the present invention is not limited thereto.

In this embodiment, the present invention takes a two-dimensional distance measuring device as an example. As a result, the present invention may further include a revolving unit 20 disposed on the seat 31 for driving the distance sensing unit 10 to revolve according to a revolving angle. Herein, a revolving direction of the revolving unit 20 is substantially perpendicular to a rotation direction of the drive unit 30. For example, the drive unit 30 drives the distance sensing unit 10 to rotate in an X-Y plane, and the revolving unit 20 drives the distance sensing unit 10 to revolve in an X-Z plane (or a Y-Z plane), but the present invention is not limited thereto. Furthermore, the compensation unit 40 may acquire a revolving angle at the time when the revolving unit 20 drives the distance sensing unit 10 to revolve, so as to provide a compensation value according to the revolving angle.

Figure 3:
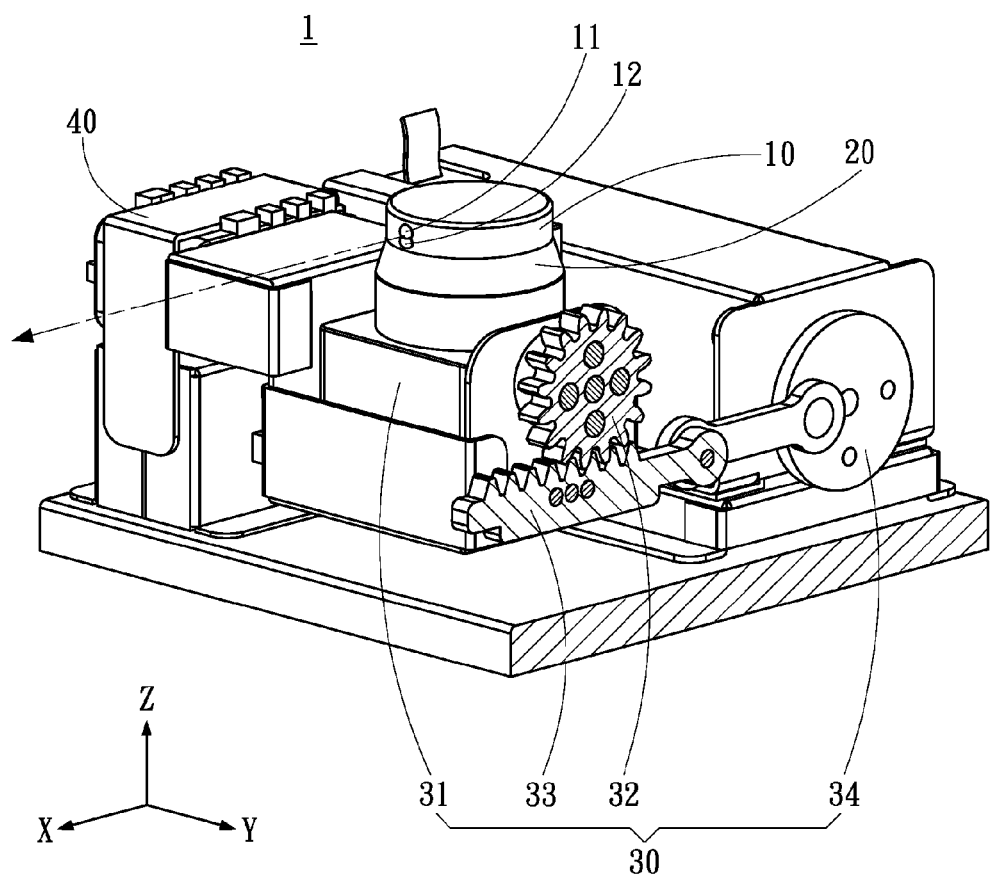
FIG. 3 is a first schematic operation view of the present invention.
Figure 4:
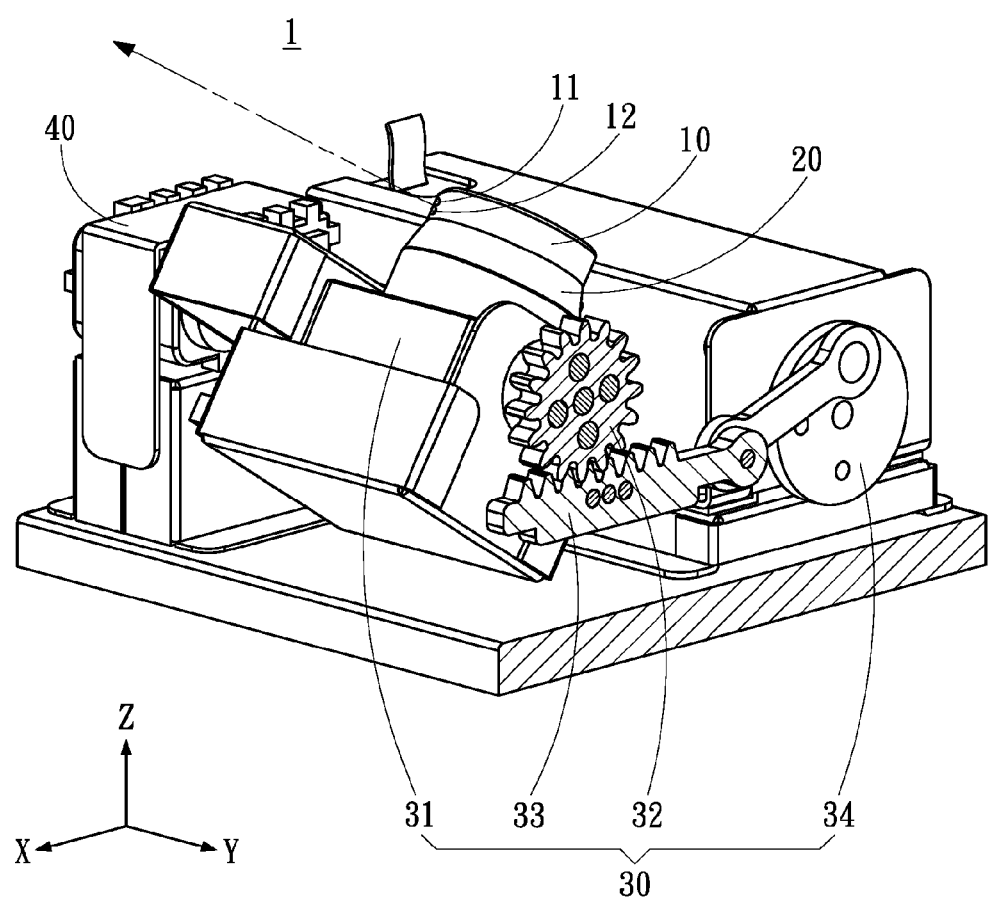
FIG. 4 is a second schematic operation view of the present invention.
Figure 5:
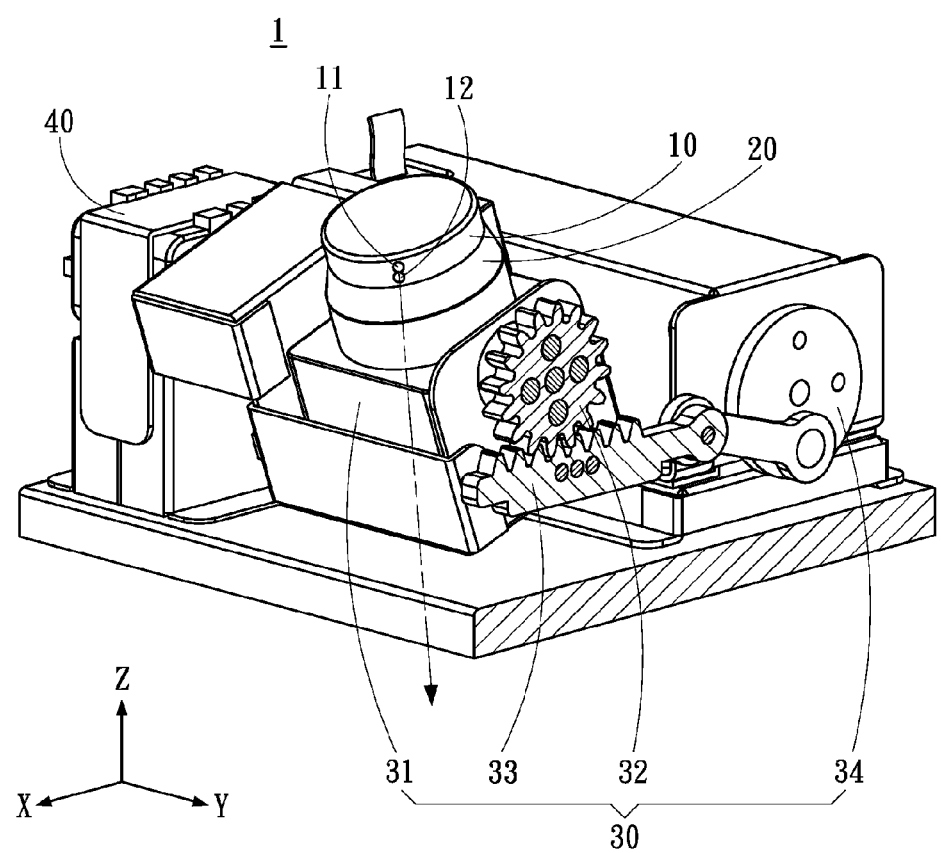
FIG. 5 is a third schematic operation view of the present invention.

Please refer to FIGS. 3, 4, and 5, in which when the cam 34 of the drive unit 30 rotates it drives the rack 33 to displace reciprocally in advancing and retreating directions. When the rack 33 advances, the gear 32 rotates in a clockwise direction to drive the seat 31 to rotate upwards, such that the distance sensing unit 10 rotates upwards. When the rack 33 retreats, the gear 32 rotates in a counterclockwise direction to drive the seat 31 to rotate downwards, such that the distance sensing unit 10 rotates downwards. Moreover, the distance sensing unit 10 continuously emits distance measuring signals with the emitter 11 and receives the distance measuring signals reflected by the target object with the receiver 12 in the process of rotation. At the same time when the drive unit 30 drives the distance sensing unit 10 to rotate, the revolving unit 20 drives the distance sensing unit 10 to revolve repeatedly within a revolving angle. The compensation unit 40 may acquire a rotation angle at the time when the drive unit 30 drives the distance sensing unit 10 to rotate and meanwhile acquire a revolving angle at the time when the revolving unit 20 drives the distance sensing unit 10 to revolve, provide a compensation value according to the rotation angle and the revolving angle, and then obtain an actual distance according to the compensation value and the distance value sensed by the distance sensing unit 10. Herein, after acquiring the rotation angle and the revolving angle, the compensation unit 40 may perform a space coordinate conversion to obtain the space coordinates of the target object, and connect the space coordinates of the target object to coordinates of the distance sensing unit 10, so as to obtain a relative position of the target object to the distance sensing unit 10 to calculate the actual distance. Therefore, a variable velocity of rotation caused by a simple harmonic motion of the reciprocating mechanism and an error due to that the position of an axis of revolution is not in the center can be corrected, so as to achieve an effect similar to that of a three-dimensional laser rangefinder.

The present invention uses a reciprocating mechanism to drive a distance sensing unit to move, so as to add an additional dimension thereto. For example, an original one-dimensional distance sensing unit achieves the measuring effect of a two-dimensional distance sensing unit by means of the reciprocating mechanism, or an original two-dimensional distance sensing unit achieves the measuring effect of a three-dimensional distance sensing unit by means of the reciprocating mechanism. Furthermore, the present invention may also apply two reciprocating mechanisms to a one-dimensional distance sensing unit, so that two dimensions are added to the one-dimensional distance sensing unit and it achieves the measuring effect of a three-dimensional distance sensing unit. In the present invention, measuring dimensions of the distance sensing unit are increased by the reciprocating mechanism having a low cost, and the simple harmonic motion caused by the reciprocating mechanism is corrected through acquisition of a rotation/revolving angle by a back-end compensation unit, such that the present invention can solve the problem of an excessively high cost of a conventional three-dimensional laser rangefinder, and can thus be widely applied in fields such as environment recognition, environment construction, obstacle detection, and the positioning of a robot.

While the present invention has been described by the way example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A distance measuring device, comprising:
   a distance sensing unit, for sensing a distance value of a target object;
   a drive unit, for driving the distance sensing unit to rotate according to a rotation angle, comprising:
      a seat, for disposing the distance sensing unit;
      a gear, located on a side edge of the seat;
      a rack, engaged with the gear; and
      a cam, revolving to drive the rack to displace reciprocally and driving the gear to rotate by the rack, so as to drive the seat to rotate; and
   a compensation unit, for providing a compensation value according to the rotation angle and obtaining an actual distance according to the compensation value and the distance value.

2. The distance measuring device according to claim 1, further comprising: a revolving unit for driving the distance sensing unit to revolve according to a revolving angle.

3. The distance measuring device according to claim 2, wherein a rotation direction of the drive unit is substantially perpendicular to a revolving direction of the revolving unit.

4. The distance measuring device according to claim 2, wherein the compensation unit provides the compensation value according to the revolving angle.

5. The distance measuring device according to claim 1, wherein the distance sensing unit comprises an emitter and a receiver, the emitter is used fir emitting a distance measuring signal, and the receiver is used for receiving the distance measuring signal reflected by the target Object.

6. The distance measuring device according to claim 5, wherein the emitter is a laser emitter.

7. The distance measuring device according to claim 5, wherein the emitter is an infrared emitter.

8. The distance measuring device according to claim 5, wherein the emitter is an ultrasonic emitter.

9. The distance measuring device according to claim 1, wherein the drive unit is a motor.

10. The distance measuring device according to claim 1, wherein the compensation unit is a multi-link reciprocating mechanism.

11. The distance measuring device according to claim 1, wherein the compensation unit is an encoder.

* * * * *